UNITED STATES PATENT OFFICE.

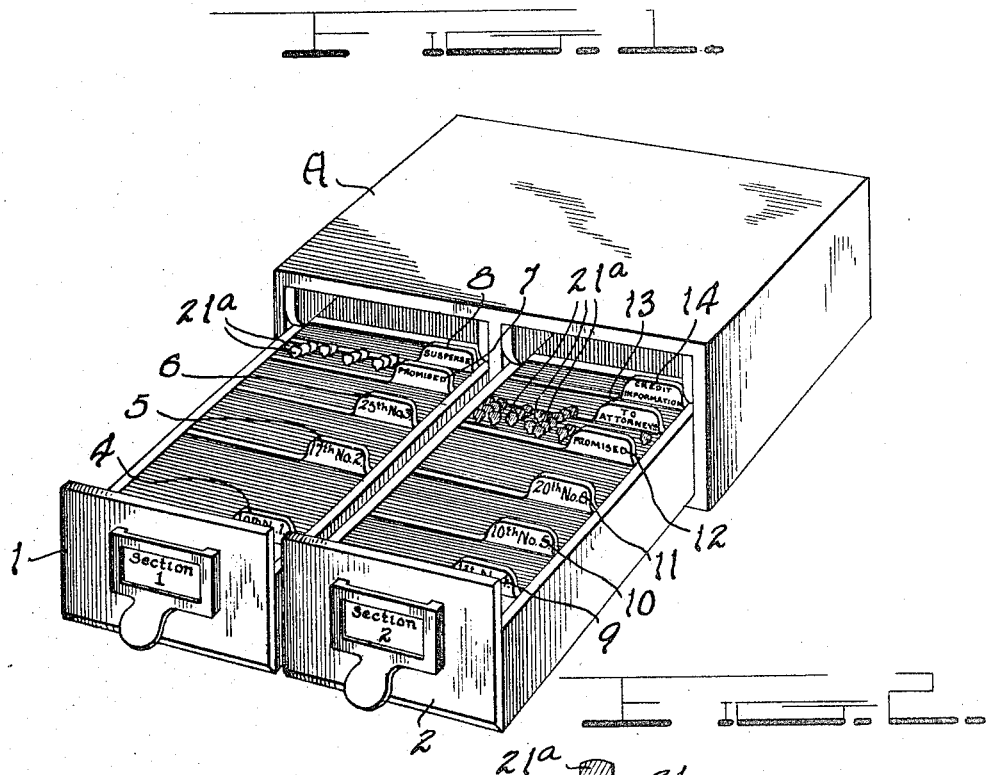

CHARLES M. TURTON AND CHESTER M. MINIER, OF LOS ANGELES, CALIFORNIA.

DEVICE FOR FOLLOWING UP ACCOUNTS.

1,178,113. Specification of Letters Patent. Patented Apr. 4, 1916.

Application filed May 11, 1915. Serial No. 27,339.

*To all whom it may concern:*

Be it known that we, CHARLES M. TURTON and CHESTER M. MINIER, both citizens of the United States, residing at Los Angeles, in the county of Los Angeles and State of California, have invented certain new and useful Improvements in Devices for Following Up Accounts, of which the following is a specification.

The present invention relates to an index and follow up device for use in collecting accounts, the primary object of the invention being to provide a device of this character which can be successfully used by retail credit houses and will enable accounts to be collected with a very small loss. A business can not expand to its normal volume on a cash basis, and credits, when intelligently opened and safe-guarded by an effective credit collection system such as is made easily possible by the use of the present device, will not average to exceed one per cent. of loss.

Further objects of the invention are to provide a comparatively inexpensive device of this character which will automatically keep watch over an account the moment it becomes due, guide it along a fixed course and provide a means to obtain a prompt and courteous collection, which will check up promises to pay and keep under close observation the account which for some special reason is allowed to drag, and which affords a safe and effective means of bringing strong pressure to bear on the overdue account which merits drastic action.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a perspective view of a two drawer card cabinet provided with suitable division cards for properly separating the individual account cards. Fig. 2 is a plan view of one of the account cards, showing an indicator clip applied to the upper edge thereof.

Corresponding and like parts are referred to in the following description and indicated in all the views of the drawings by the same reference characters.

Referring to the drawings, the reference character A designates a card cabinet which is provided with two drawers 1 and 2 respectively, within which the account cards 3 are kept. One of these account cards is shown in detail by Fig. 2 and the account cards within the drawers 1 and 2 are divided into groups by suitable index cards, the ears or tabs upon the latter preferably having a distinctive color such as red, so that there will be no possibility of confusion between the index cards and any suitable alphabetical cards which it may be desired to employ in connection with the different groups of account cards. The drawer 1 may be designated as section No. 1, and the drawer 2 as section No. 2, the first drawer taking care of the cards for a period of one month, after which they are transferred to the second drawer which takes care of the cards during the second month.

The drawer 1, constituting section No. 1, is provided with an index card 4 marked "10th No. 1," a second card 5 marked "17th No. 2," a third card 6 marked "25th No. 3," a fourth card 7 marked "Promised" and a fifth card 8 marked "Suspense." In a similar manner, the drawer 2, constituting section No. 2, is provided with an index card 9 marked "1st No. 4," a second index card 10 marked "10th No. 5," a third index card 11 marked "20th No. 6," a fourth index card 12 marked "Promised," a fifth index card 13 marked "To attorneys," and a sixth index card 14 marked "Credit information." As previously explained the ears or tabs upon these index cards are in some distinctive color such as red so that they can be easily followed up and will not be confused with any alphabetical index cards which it may be desired to employ in the different groups or divisions of account cards.

Each of the account cards 3 is provided at the top thereof with a suitable space 15 for the name and address of the debtor, and at the bottom thereof with a space 16 for any remarks which may be deemed appropriate. Between the spaces 15 and 16 a line 17 is provided to receive data for identifying the account, such as the amount and the date thereof, as well as the ledger number and page. Under the line 17 is a line 18 providing spaces to be filled out as the card progresses through section No. 1, and a similar line 19 is provided under the line 18, said line 19 having blank spaces to be filled in as the card progresses through section No. 2. Extending along the upper edge of the card 3 is a series 20 of numerals, ranging from 1 to 31 inclusive. These numerals 20 are adapted to be used in connection with metal clips 21 to indicate any particular day of the month when payment is promised by the debtor.

In using the device, the account cards will ordinarily be made up and started on their course through the drawers 1 and 2, on the 10th of the month following the month in which purchases were made. For example, the usual itemized statement would be mailed to the debtor on the first of February for the purchases made during January. Should payment not be received by the 10th, one of the cards 3 would be properly filled out and placed in the division of section No. 1 marked "17th." At the same time a statement (not itemized) would be sent to the debtor with notification No. 1 attached, said notification reading substantially as follows, "This account, which is past due, has probably been overlooked by you. We would appreciate your early attention." Upon the 17th, the account remaining unpaid, the card would be transferred to the division marked "25th" and a statement sent with notification No. 2 attached, said notification reading substantially as follows, "We have been waiting to hear from you on this account. If not convenient to settle in full at this time a partial payment will be appreciated." Upon the 25th, the account still remaining unpaid, the account card would be advanced to the division marked "Suspense" and another statement mailed with notification No. 3 attached, said notification reading substantially as follows, "If there is any reason why this account should not be paid without further delay, kindly inform us."

Upon the first of the next month the account cards 3 would be removed from the "suspense" division of section No. 1 and transferred to section No. 2. Statements would be then mailed and the cards transferred to the division marked "10th", notification No. 4 being attached to the statement, said notification reading as follows, "Several requests have been made for payment of this account and unless it receives attention before —— it will be placed in other hands with instructions to collect with costs." On the 10th, notification No. 5 would be mailed and the card advanced to the division marked "20th." Notification No. 5 is preferably in the form of a special statement, having printed matter thereon indicating that the creditor is a member of some particular creditors' association for reporting delinquent debtors, and also containing some such notice as the following, "This account is long past due and we insist on immediate payment of same. By promptly complying with this request you will be saved embarrassment and costs and will obviate the disagreeable necessity on our part of proceeding toward collection of our claim through the above named association of which we are members." On the 20th, the account being still unpaid, notification No. 6 would be sent, said notification being mailed in a plain envelop and being in the form of a notice purporting to come from the creditors' association mentioned in notification No. 5 and having printed thereon a suitable notice such as the following, "You have not yet responded to the many requests of our member for a remittance. Protect your credit by arranging to liquidate the claim against you on or before the 25th day of —— 19——. As we regret having such cases brought before us we trust that you will at once remit to our members and save all parties further trouble in the matter." Should the account still remain unpaid on the 25th, the account card would be advanced to the division marked "To attorneys." At the same time, an itemized statement would be mailed to the attorneys for the creditors' association on a suitable blank provided for that purpose and a duplicate mailed to the company furnishing the cards and system to insure proper checking up of the collection at the office of the company.

The first four notifications mentioned above would be attached to ordinary statements, and could be printed upon small slips of paper having a suitable adhesive on one corner or at one edge thereof so that they can be easily applied to the statements. Notifications No. 5 and No. 6 would be special blanks provided with spaces to receive the name of the debtor and the amount of the account, notification No. 5 being signed by the creditor himself and containing a notice that he is a member of a certain creditors' association, while notification No. 6 is mailed in a plain envelop and is signed by the creditors' association.

If, at any stage of the first month, the debtor promises payment at a certain date, the card is placed in the division marked "Promised" with the indicator clip 21 set on the date specified. The finger tabs 21ᵃ of the clips 21 are suitably painted or coated to provide a surface upon which pencil marks can be made and subsequently erased. If the promise is for a date in the following month, the clip 21 is set on the proper date and the name of the month written on the finger tab 21ᵃ. These cards are thus marked so that they can be carefully watched and if the promise is not kept the debtor can be followed up with proper form letters. Should repeated promises be made, the indicator can be changed each time to indicate the date so promised, and if the creditor is convinced that the promises are not made in good faith the card can be put promptly through section No. 2. This same idea is followed in using the "promised" division of section No. 2.

With the use of this device the creditor has his entire list of due accounts under constant surveillance so that he can tell at a glance at what stage they stand. The "good but slow" account is under prominent observation in "suspense," the one which is delinquent, but promised for a certain date, is where the "promise" may be watched, the account which it is desired to force is getting active treatment in section No. 2, while the great bulk of good, prompt accounts are being courteously reminded of the passage of time and impressed with the fact that you expect, and so probably will be appreciative of, promptness.

It will be understood that the sets of cards may be kept in any desired cabinet and that the exact wording and number of the index cards is susceptible of variation. Section No. 1 or section No. 2 may both be in the same drawer and a greater or less number of indicator cards may be employed in each section, depending upon the frequency with which it is desired to follow up and send notices to delinquent debtors. In all forms of the invention, however, the account cards will be advanced step by step through the different divisions of the two sections as the successive notifications are mailed, thereby enabling the creditor to tell at a glance at what stage of collection the different accounts stand. It will also be understood that envelops might be substituted for the account cards 3 and advanced through the various divisions as the account cards.

Having thus described the invention, what I claim as new and desire to secure by Letters Patent, is:—

1. A device for following up accounts, including individual account cards provided with spaces for the name and address of the debtor and the amount of the account, and also having a series of numerals at the upper edge thereof for the different days of the month, division cards dividing the account cards into groups and having the successive dates marked thereon when it is desired to send notifications to the debtors, and one of the division cards being marked "Promised", the individual account cards being adapted to be advanced through the several divisions as the successive notifications are mailed, and to be placed in the division marked "Promised" when a promise is received, and a metal clip adapted to be applied to the upper edge of an account card in the "promised" division for coöperation with the numerals at the upper edge of the card to indicate the date of the promise.

2. A device for following up accounts, including a series of individual account cards provided with spaces to receive the name and address of the debtor as well as the amount of the account, division cards dividing the account cards into groups and having the successive dates marked thereon when it is desired to send notifications to the debtor, one of the division cards being marked "Promised", and metal clips adapted to be applied to the upper edges of the cards in the promised division to indicate the date of the promise, said clips being formed with finger pieces having surfaces upon which the month of the promise can be marked and subsequently erased, the account cards being adapted to be advanced through the successive divisions as notifications are sent on the dates indicated, and to be placed in the "promised" division when a promise is received.

3. A device for following up accounts, including a series of individual account cards provided with spaces to receive the name and address of the debtor and the amount of the account, and two sets of division cards of the account, arranged in two different sections which are provided for successive months, the division cards dividing the account cards and being marked with the successive dates of the respective months upon which notifications are to be sent to the debtors, each account card being advanced through one section as the successive notifications are mailed one month, and then advanced through the divisions of the second section as the different notifications are mailed the second month.

4. A device for following up accounts, including a series of individual account cards provided with spaces to receive the name and address of the debtor as well as the amount of the account and being provided at the upper edges thereof with a series of numerals corresponding to the days of the month, two sets of division cards providing two sections corresponding to successive months, the division cards of each section being marked with the successive dates upon which notifications are to be sent to the debtor and one of the division cards of each section being marked "Promised", the last division card of the first section being marked "Suspense" while the last division card of the second section is marked "To attorneys", each account card being adapted to be advanced through the successive divisions of the first section as the different notifications are mailed to the debtors on the dates indicated and finally placed in the division marked "Suspense", from which it is taken at the end of the first month and advanced through the successive divisions of the second section as the proper notifications are sent the second month, being then placed in the division "to attorneys", a card in either section upon which a promise is received being placed in the "promise" division, and metal clips adapted to be applied to the upper edges of the cards in the "promised" divisions for coöperation with the before mentioned series of numbers upon the cards to indicate the date of the promise.

In testimony whereof we affix our signatures in presence of two witnesses.

CHARLES M. TURTON.
CHESTER M. MINIER.

Witnesses:
H. L. BIDELMAN,
W. P. BIDELMAN.